United States Patent
Schwartz

(10) Patent No.: US 7,570,670 B2
(45) Date of Patent: Aug. 4, 2009

(54) METHOD AND SYSTEM FOR COMMUNICATING AND PROCESSING VOIP PACKETS USING A JITTER BUFFER

(75) Inventor: Zarick Schwartz, Mountain Lakes, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 214 days.

(21) Appl. No.: 11/436,567

(22) Filed: May 19, 2006

(65) Prior Publication Data

US 2007/0268887 A1    Nov. 22, 2007

(51) Int. Cl.
  *H04J 3/06* (2006.01)
(52) U.S. Cl. .................... 370/516; 370/252; 370/394
(58) Field of Classification Search ............ 379/266.01, 379/266.03, 389, 390, 90.01; 370/252, 473, 370/394, 516, 902, 912
  See application file for complete search history.

(56) References Cited

U.S. PATENT DOCUMENTS

| | | | |
|---|---|---|---|
| 6,389,032 | B1 | 5/2002 | Cohen |
| 6,944,174 | B1 * | 9/2005 | Chow .......................... 370/413 |
| 2003/0152093 | A1 | 8/2003 | Gupta |
| 2005/0232309 | A1 | 10/2005 | Kavaler |

OTHER PUBLICATIONS

Article: Techniques for Packet Voice Synchronization, Warrant A Montgomery, Dec. 1983; EEE Journal on Selected Areas in Communications, vol. 2. SAC-1, No. 6.
ISR and written opinion dated Nov. 14, 2007.

* cited by examiner

*Primary Examiner*—Curtis Kuntz
*Assistant Examiner*—Yosef K Laekemariam

(57) ABSTRACT

A method and system for communicating and processing VOIP packets using a jitter buffer. The method includes receiving VOIP packets from a plurality of base stations, buffering the received VOIP packets in a jitter buffer and playing the VOIP packets from the jitter buffer. The VOIP packets received from the plurality of base stations being related to a same VOIP transmission.

10 Claims, 5 Drawing Sheets

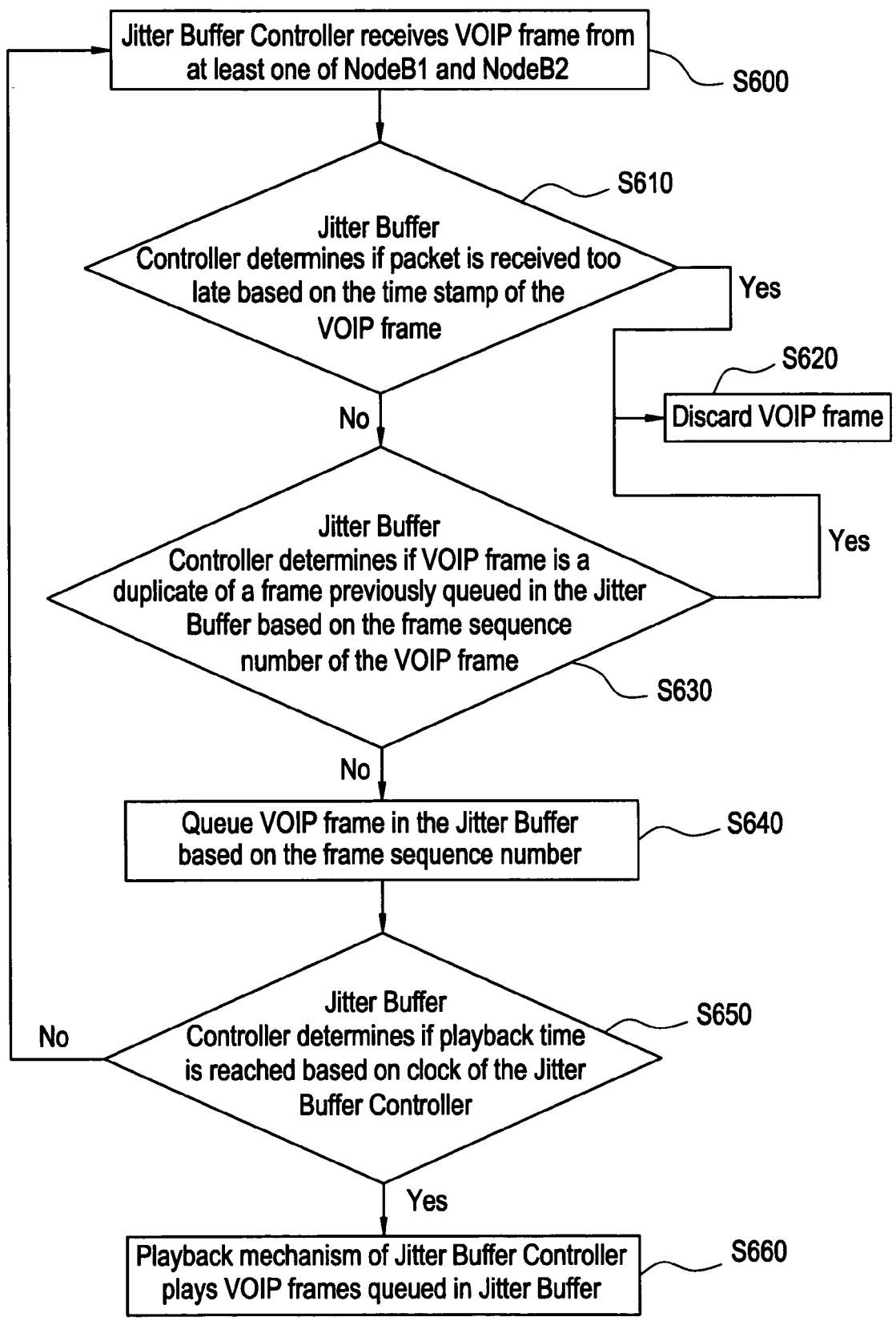

METHOD AND SYSTEM FOR COMMUNICATING AND PROCESSING VOIP PACKETS USING A JITTER BUFFER

BACKGROUND OF THE INVENTION

A cellular communications network typically includes a variety of communication nodes coupled by wireless or wired connections and accessed through different types of communications channels. Each of the communication nodes includes respective protocol stacks that process the data respectively transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (UL) (e.g., a communication flow from a mobile station (MS) or User Equipment (UE) to a base station (BS) or NodeB). The dedicated channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control sub-channel in accordance with CDMA2000 protocols, etc.).

FIG. 1 illustrates a conventional wireless communication system 100 operating in accordance with UMTS protocols. Referring to FIG. 1, the wireless communication system 100 may include a number of NodeBs 110, each serving the communication needs of an user equipment UE 105 in a respective coverage area. The NodeBs 110 are connected to a radio network controller (RNC) 120. RNCs 120 are connected to a core network (CN) 130 including, for example in case of UMTS a Mobile Switching Center (MSC) (not shown) and Serving GPRS Support Node (SGSN) (not shown). The RNC 120 handles certain call and data handling functions, such as, autonomously managing handovers without involving a MSC and SGSN. The MSC and SGSN handle routing calls and/or data to RNCs 120 in the Radio Access Network (RAN) or to a CN 130 including for example, a Gateway GPRS Support Node (GGSN) (not shown), a Policy Decision Function (PDF) (not shown) and an Application Function (AF) (not shown).

FIG. 2 illustrates a conventional wireless communication system operating in accordance with CDMA2000 1xEV-DO protocols. Referring to FIG. 2, the wireless communication system 200 may include a number of base transceiver stations (BTS) 220, each serving the communication needs of mobile stations (MS) 205 in a respective coverage area. The BTSs 220 are connected to a RNC 215. The RNC is connected to a core network (CN) 230, which includes a Packet Data Serving Node (PDSN) (not shown), which is connected to a home Authentication, Authorization and Accounting Server AAA (not shown). BTSs 220 and RNCs 215 of the conventional wireless communication system 200 function similar to their counter parts NodeBs 110 and RNCs 120 in the conventional wireless communication system 100. Likewise, the PDSN of the wireless communication system 200 functions similar to the GGSN and SGSN of wireless communication system 100.

Conventionally, transmission of High Speed Data (HS-DPA, EV-DO) is performed via a single BTS 220 or NodeB 110. High speed data is not transmitted from multiple base transceiver stations BTSs 220 to a single MS 205 or multiple NodeBs 110 to a UE 105 because the transmission of high speed data conventionally requires scheduling on each of the BTSs 220 or NodeBs 110 and the scheduling between BTSs 220 or NodeBs 110 is not synchronized.

Conversely, data channel (DCH) traffic (e.g., voice frames) can be transmitted from multiple base stations BTSs 220 or NodeBs 110 as long as the timing of transmitting the voice frames from multiple base stations BTSs 220 or the NodeBs 110 is substantially the same.

Networks used for sending VOIP frames result in variable network delay in the packet arrival to a destination. This variable delay is referred to as jitter. Jitter results in a network for several reasons including: queues in the routers prioritizing packets based on QOS or FIFO; sudden increase and/or decrease in network congestion; LAN collision; etc.

In order to avoid problems stemming from jitter, a conventional end system such as a MS 205 or UE 105 designed to process VOIP frames includes a jitter buffer. The jitter buffer alleviates problems stemming from jitter by queuing VOIP frames and replaying the VOIP frames with the same time spacing that was generated by the source of the frames.

VOIP frames stored in a jitter buffer are processed by the jitter buffer controller using the following fields included in a RTP header: timestamp fields, which indicate when the voice frame needs to be played to the user; and a sequence number field, which is incremented for each transmitted voice frame and allows re-sequencing of the VOIP frames by the jitter buffer controller as is well-known in the art.

A playback mechanism of a jitter buffer is used in a conventional device to playback the VOIP frames stored in the jitter buffer. The playback mechanism checks the sequence number and the timestamp of the packet at the top of the queue at a playback time. The playback mechanism during a playback time proceeds through the queued packets and plays each packet or removes the packet and substitutes a "loss packet playback". For example, if the packet being processed by the playback mechanism is the "expected packet" as determined based on the sequence number, then the packet is played, whereas if the packet is not the "expected packet" as determined based on the sequence number (i.e., the sequence number of the next packet is larger then the sequence number of the packet that should be played), then the "packet loss playback" mechanism is used as a substitute for the packet. For example, white noise may be used by the "packet loss playback" mechanism and thus, white noise is played as a substitute for a packet that is not the "expected packet". Once all of the packets queued in the jitter buffer are processed by the playback mechanism, the playback mechanism stops until the next playback time occurs.

As is well-known in the art, the length of the jitter buffer may be static or dynamic and is dependent on the vendor's implementation. Further, as is well-known in the art, the length of the Jitter Buffer is a result of a compromise as explained below.

For example, if the length of the jitter buffer is too short, the jitter buffer will not handle sufficient jitter and packets may be dropped because the jitter buffer is full. Alternatively, if the length of the jitter buffer is too long, the jitter buffer may result in excess delay and may be unsuitable for conducting a conversation using VOIP frames. The length of a conventional jitter buffer typically buffers a number of frames corresponding to approximately 20-80 msec worth of real-time data.

SUMMARY OF THE INVENTION

One or more example embodiments of the present invention are directed towards a method of processing VOIP frames from a plurality of BTSs or NodeBs using a jitter buffer.

An example embodiment of the present invention provides a method of processing VOIP packets. The method includes receiving VOIP packets from a plurality of different base stations, buffering the received VOIP packets and playing the buffered VOIP packets. The received VOIP packets are related to a same VOIP transmission, which is sent from the plurality of base stations.

According to an example embodiment of the present invention, each of the VOIP packets includes a time stamp and a frame sequence number.

According to an example embodiment of the present invention, the method may also include determining if a VOIP packet is received after a threshold time point based on the time stamp and if the VOIP packet is a duplicate of a previously buffered VOIP packet based on the frame sequence number of the VOIP packet and the frame sequence numbers of the previously buffered VOIP packets. The buffering step buffers the received VOIP packet if the VOIP packet is not received after the threshold time point and is not the duplicate of a previously buffered VOIP packet. If the VOIP packet is determined as received after the threshold time point or is determined to be the duplicate of a previously buffered VOIP packet the VOIP packet is discarded so that the VOIP packet is not buffered.

According to an example embodiment of the present invention, the buffering step includes queuing the VOIP packet based on the frame sequence number and the playing step plays the buffered VOIP packets in an order that the VOIP packets are queued.

According to an example embodiment of the present invention, the playing step judges if a playback time is reached and plays the buffered VOIP packets each time a playback time is judged reached.

An example embodiment of the present invention provides a wireless communication device for processing VOIP packets. The device includes a jitter buffer and a jitter buffer controller. The jitter buffer buffers a plurality VOIP packets received from a plurality of different base stations, which are related to a same VOIP transmission. The jitter buffer controller controls the buffering of the plurality of VOIP packets and the playing of the buffered packets.

According to an example embodiment of the present invention, the jitter buffer controller includes a clock and a play back mechanism. The clock provides a clock signal, and the playback mechanism plays the VOIP packets buffered in the jitter buffer.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limiting of the present invention and wherein:

FIG. 4 is a flow chart of a method of receiving and processing VOIP frames received from a plurality of NodeBs or BTSs according to an example embodiment of the present invention.

DETAILED DESCRIPTION OF EXAMPLE EMBODIMENTS

Figure 1:
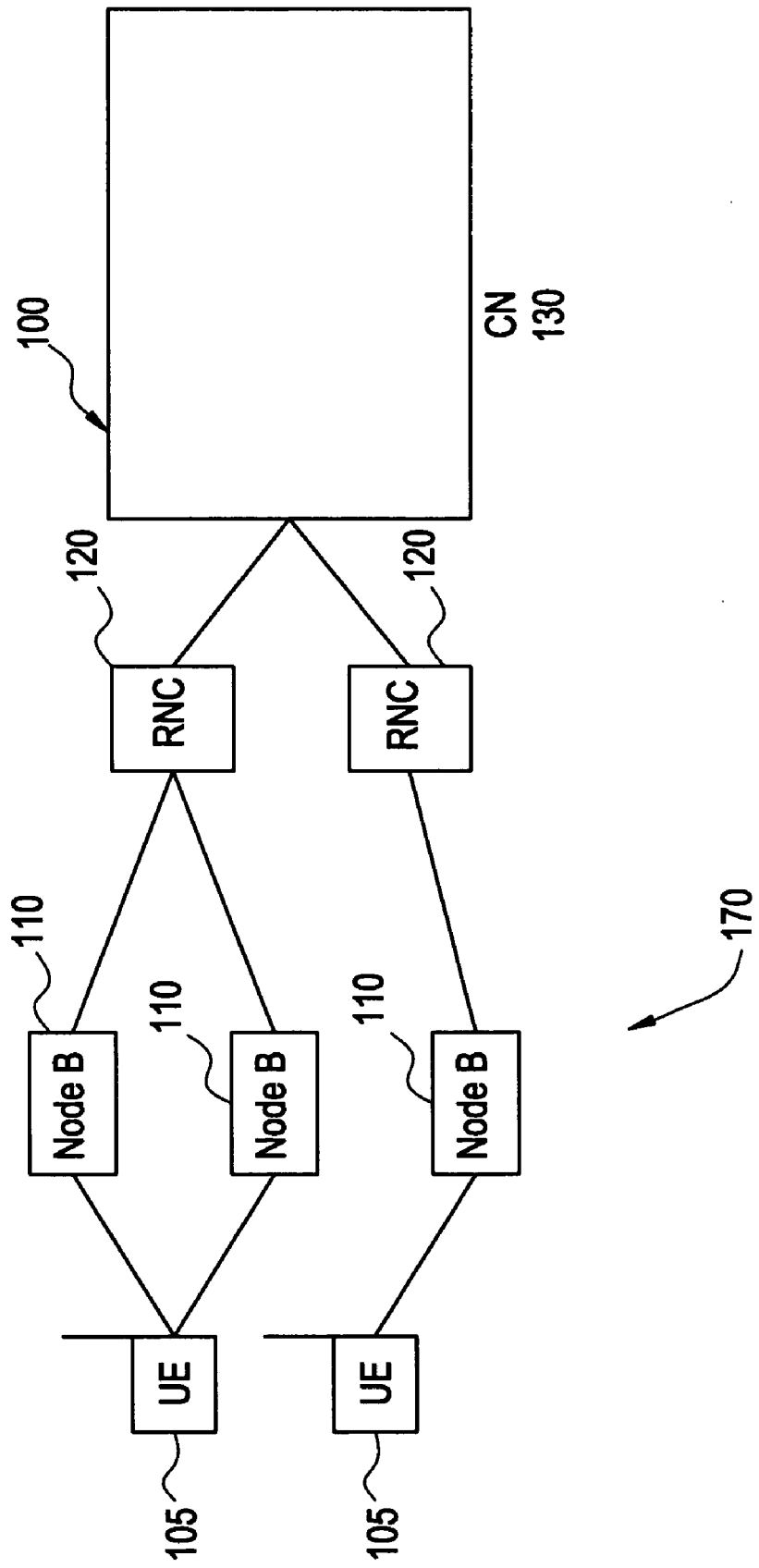
FIG. 1 illustrates a prior art wireless communication system operating in accordance with UMTS protocols.
Figure 2:
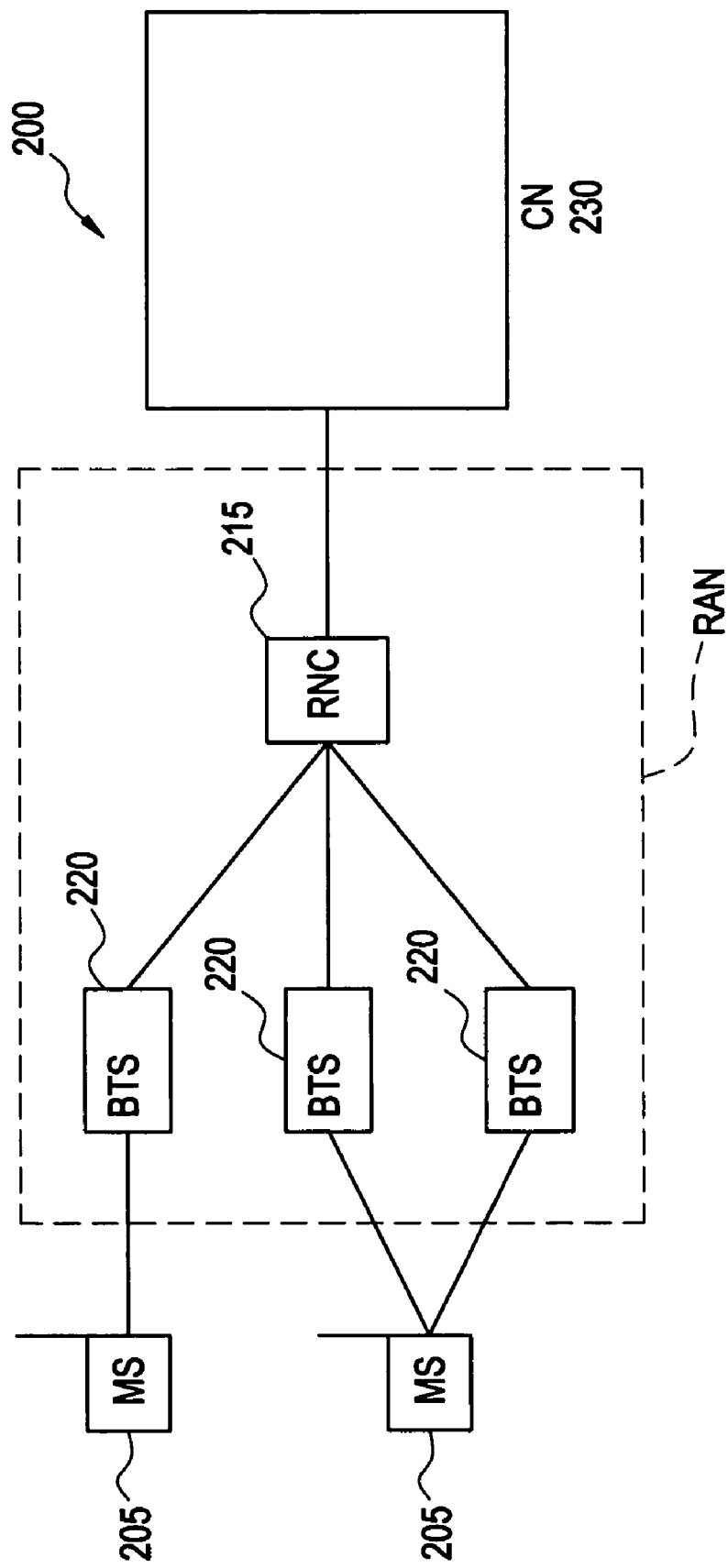
FIG. 2 illustrates a prior art wireless communication system operating in accordance with CDMA2000 1xEV-DO protocols.

The present invention relates to a method and system of receiving and processing VOIP frames received from a plurality of NodeBs or BTSs according to an example embodiment of the present invention. For the purposes of explanation only, the method and system of example embodiments of the present invention will be described as implemented by the conventional systems illustrated in FIGS. 1 and 2; however, it will be understood that the present invention is not limited in implementation to these systems.

Figure 3A:
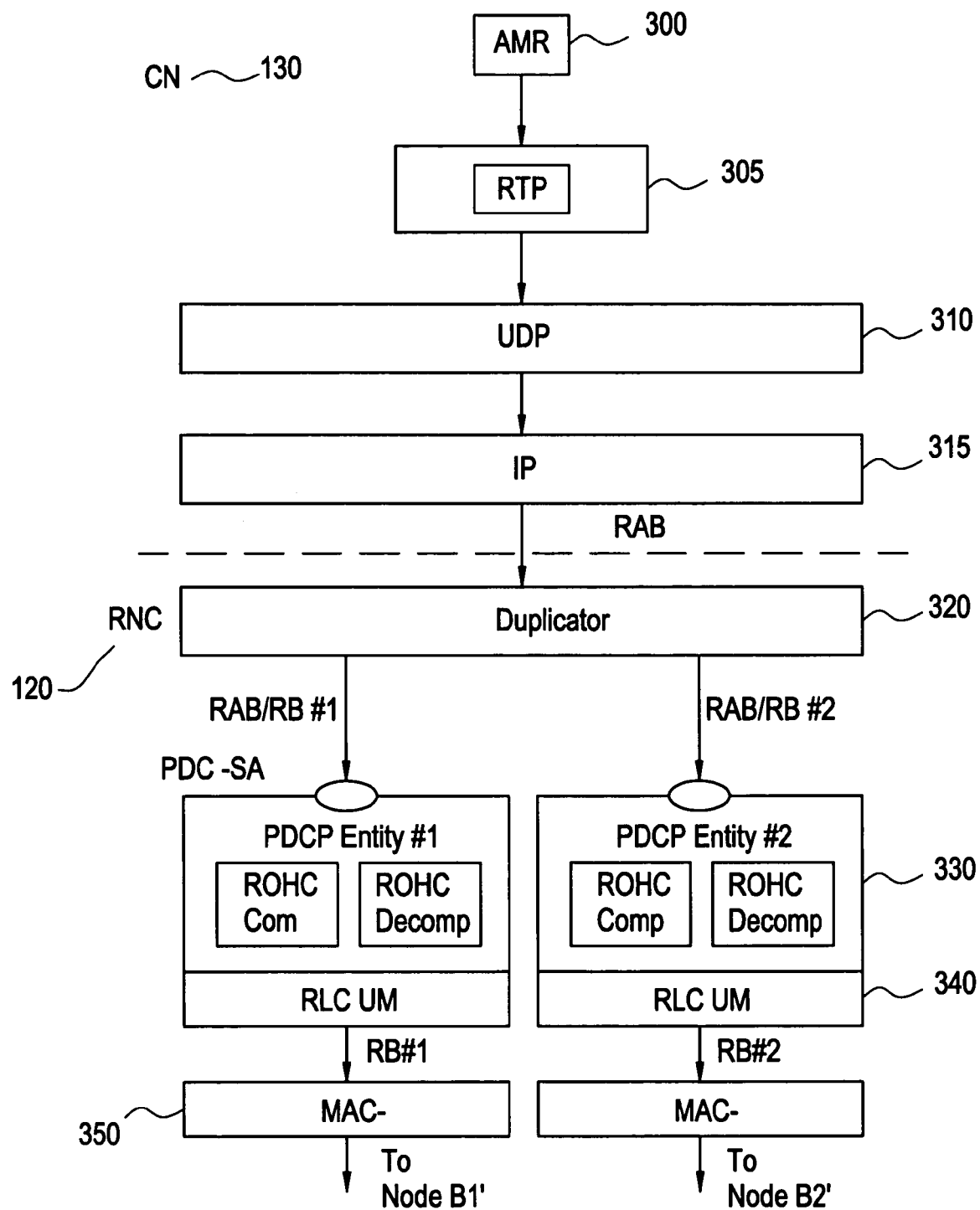
FIGS. 3A-3B are diagrams illustrating the communication of VOIP packets from a plurality of NodeBs to a UE including a jitter buffer controller and jitter buffer.
Figure 3B:
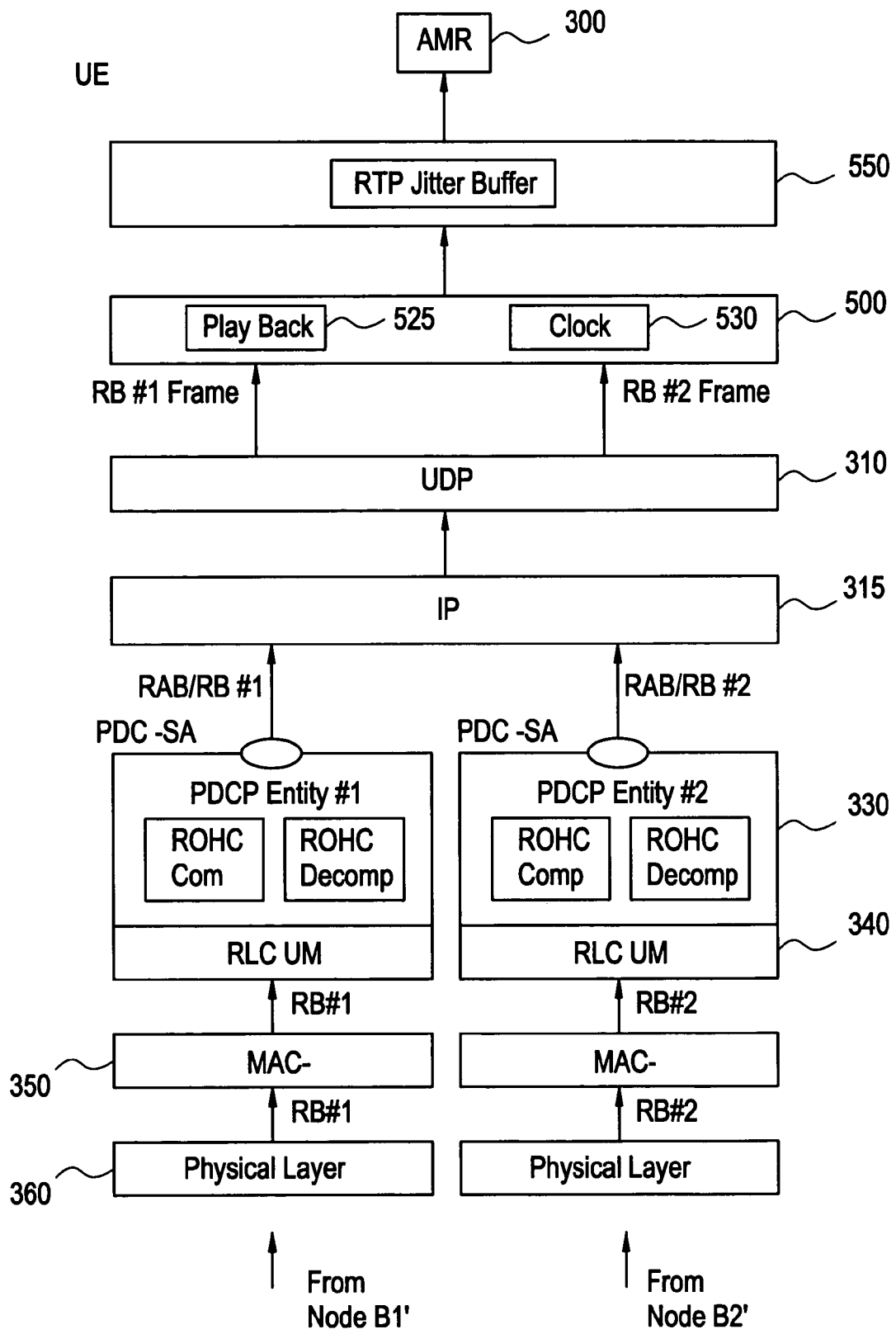

FIG. 3A and 3B are diagrams illustrating the communication of VOIP packets from a plurality of NodeBs 110 to a UE 105 including a jitter buffer controller 500 and jitter buffer 550.

In FIG. 3A, the core network CN 130 begins by converting Adaptive Multi-Rate AMR speech frames from an AMR codec 300 into a plurality of Real-Time Protocol (RTP) packets. As is well-known in the art, RTP 305 provides end-to-end network transport functions suitable for applications transmitting real-time data, such as audio, video or simulation data over multicast or unicast network services. RTP 305 does not provide a mechanism to ensure timely delivery or provide other quality of service (QoS) guarantees. RTP 305 is used in conjunction with Real-Time Control Protocol (RTCP) (not shown), which allows monitoring of the data delivery and provides a minimal amount of control and identification functionality. The use of both RTP 305 and RTCP are well-known in the art.

Applications typically run RTP 305 on top of a User Datagram Protocol (UDP) 310, which is also well-known in the art. RTP 305 is run on top of a UDP 310 to take advantage of the UDP's 310 multiplexing and checksum services. Further, to transport a UDP packet over an IP network, the UDP packet is encapsulated with an Internet Protocol (IP) packet, which is also well known in the art.

The real-time media is transferred as a RTP Payload. A RTP header contains information related to the RTP Payload such as the source, size, encoding type, etc. of the RTP Payload. A RTP header, as is well-known in the art, includes a sequence number and a timestamp. The sequence number of consecutive RTP packets is incremented by one for each RTP data packet sent, and may be used by a receiver in a UE 105 and/or MS 205 to detect packet loss and to restore a packet sequence. A timestamp reflects the sampling instant of the first octet in the RTP data packet. The sampling instant is derived from a clock that increments monotonically and linearly in time to allow synchronization and jitter calculations. Accordingly, the timestamp relates each RTP packet to real time using a clock, whereas the sequence number relates each RTP packet to other RTP packets.

As shown in FIG. 3A, the core network CN 130 issues a Radio Access Bearer (RAB) assignment request to a RNC 120 requesting the establishment of a RAB to carry VOIP frames over the wireless network. The RNC 120 configures a first set of High Speed Data (HSD) channels for controlling and transferring RAB VOIP frames over a first NodeB 110 (herein, NodeB1). For example, the first set of HSD channels includes: a Downlink Shared Channel (HS-PDSCH), depicted in the FIG. 3A as RB#1; a High Speed Shared Control Channel (HS-SCCH) (not shown), which is controlled exclusively by the NodeB1; and an Uplink High Speed Dedicated Physical Control Channel (HS-DPCCH) (not shown), which is controlled exclusively by a UE 105 and is terminated in the NodeB1.

According to an example embodiment of the present invention, the RNC 120 configures a second set of HSD channels, which is identical to the first set, for controlling and transferring the same RAB VOIP frames that are transferred using NodeB1 using a second NodeB 110 (herein, Node B2). The second Downlink Shared Channel is depicted in FIG. 3A as RB#2. It is noted that the RNC 120 may be configured to always configure the second set of HSD channels, or alternatively only configure the second set of HSD channels under specified conditions. The specified conditions include when bad reception of the first set is detected, during a handover mode, etc.)

The RNC 120 notifies the UE 105 about the configuration of the additional HSD set via a control message.

As shown in FIG. 3A, the RNC 120 includes a duplicator 320 according to an example embodiment of the present invention. The duplicator 320 of the RNC 120 intercepts VOIP frames sent by the CN 130 and sends the VOIP frames over the first Downlink Shared Channel RB#1. If a second set of HSD channels is configured as described above, the duplicator 320 duplicates the VOIP frames sent over the first Downlink Shared Channel RB#1 and will send the duplicated VOIP frames over the second Downlink Shared Channel RB#2.

According to an example embodiment of the present invention, there is no need to synchronize the transmission of the VOIP frames sent via NodeB 1 over RB#1 and the VOIP frames sent via NodeB2 over RB#2. The reason that the timing is not important is that the VOIP frames received by the UE are not played immediately, instead the VOIP frames are queued in a jitter buffer. Accordingly, the jitter buffer plays the queued VOIP frames after a delay of, for example 20-80 msec, as will be described in greater detail below with respect to FIG. 4.

As is well known in the art, a PDCP Entity 330 performs RTP, UDP and IP header compression on the VOIP frames received from the duplicator 320. The VOIP frames undergo transfer, segmentation and reassembly, ciphering and/or sequencing as illustrated by the Radio Link Control Unacknowledged Mode (RLC UM) 340 in FIG. 3A. Further, the VOIP frames are processed in the MAC layer 350 as is well-known in the art before the VOIP frames are sent to the UE via a physical layer 360 as is well-known in the art.

A UE 105 according to an example embodiment of the present invention is configured to receive VOIP frames from a plurality of base stations in response to a control message sent from the RNC 120 indicating that an additional HSD set has been established. For example, in FIG. 3B, the UE 105 receives and processes protocol stacks received from NodeB1 and NodeB2.

In particular, a protocol stack received over a first Downlink Shared Channel RB#1 from NodeB1 is received and processed in the physical layer 360, MAC layer 350, RLC UM 340, PDCP entity 330, IP 315 and UDP 310 as is well known in the art, and is then sent to the jitter buffer controller 500 for further processing. Similarly, a protocol stack received over a second Downlink Shared Channel RB#2 from NodeB2 is received and processed in the physical layer 360, MAC layer 350, RLC UM 340, PDCP entity 330, IP 315 and UDP 310 as is well known in the art, and is then sent to the jitter buffer controller 500 for further processing.

FIG. 4 is a flow chart of a method of receiving and processing VOIP frames received from a plurality of NodeBs 110 or BTSs 220 according to an example embodiment of the present invention.

As shown in FIG. 4, the jitter buffer controller 500 receives VOIP frames from at least one of NodeB1 and NodeB2 in step S600. In step S610, the jitter buffer controller 500 determines if the VOIP frame is received too late based on the timestamp of the VOIP frame. For example, the jitter buffer controller 500 includes a clock 530, which is used in conjunction with the timestamp to determine when the VOIP frame should be played. For example, if the timestamp indicates that the VOIP frame has arrived too late, i.e., after the delay permitted by the use of the jitter buffer 550 or after a threshold time point corresponding to a playback time, then the VOIP frame is discarded in S620 of FIG. 4.

If the jitter buffer controller 500 determines based on the timestamp that VOIP frame has not arrived too late, then the jitter buffer controller determines if the VOIP frame is a duplicate of a frame previously queued in the jitter buffer 550 based on the frame sequence number of the VOIP frame in step S640. For example, if a VOIP frame having a frame sequence number is received over NodeB1 and queued in the jitter buffer 550, and then a frame having the same frame sequence number is received over NodeB2, the frame received having the same frame sequence number from NodeB2 is discarded as illustrated by step S620 in FIG. 4.

In step S630, if the jitter buffer controller 500 determines a received VOIP frame is not a duplicate of a frame previously queued in the jitter buffer 550, the received frame is queued in the jitter buffer 550 based on the frame sequence number in step S640. For example, if packets N, N+2 and N+1 arrive at the jitter buffer controller 500 in this order, then the first received packet N is queued in the jitter buffer 550, the second received packet N+2 is queued in the jitter buffer 550 and when third received packet N+1 arrives, the third received packet N+1 is placed in the jitter buffer queue between the first received packet N and the second received packet N+2 by the jitter buffer controller 500.

In step S650 of FIG. 4, the jitter buffer controller 500 determines if a playback time is reached based on a clock 530 of the jitter buffer controller 500. The playback time may correspond to a delay provided by the jitter buffer 550, which may be within a range of 20-80 msec. If the playback time has not been reached, the method according to an example embodiment of the present invention proceeds back step S600 of FIG. 4 and receives another VOIP packet from at least one of NodeB1 and NodeB2.

Alternatively, if in step S650, the jitter buffer controller 500 determines the playback time has been reached, the playback mechanism 525 plays the VOIP frames queued in the jitter buffer 550 as illustrated by step S660 of FIG. 4. For example, each 20 msec a playback mechanism 525 of the jitter buffer controller 500 plays the frames queued in the jitter buffer 550.

The playback mechanism 525 of the jitter buffer controller 500 checks the frame sequence number and the timestamp of the packet at the top of the queue at a playback time. The playback mechanism during playback proceeds through the queued packets and plays each packet or discards the packet and substitutes a "loss packet playback". For example, if the packet being processed by the playback mechanism 525 is the "expected packet" based on the sequence number, then the packet is played, whereas if the packet is not the "expected packet", then the "loss packet playback" is used as a substitute for the packet. For example, white noise may be played as a substitute for a packet that is not the "expected packet". Once all of the packets queued in the jitter buffer 550 are processed by the playback mechanism 525, the playback mechanism stops until the next playback time occurs.

Example embodiments of the present invention being thus described, it will be obvious that the same may be varied in many ways. Such variations are not to be regarded as a departure from the invention, and all such modifications are intended to be included within the scope of the invention.

I claim:

1. A method of processing Voice over Internet Protocol (VOIP) packets comprising:
   receiving VOIP packets from a plurality of different base stations at a user equipment, the VOIP packets being related to a same VOIP transmission, wherein each of the VOIP packets includes a time stamp and a frame sequence number;
   determining if a VOIP packet is received after a threshold time point based on the time stamp;
   determining if the VOIP packet is a duplicate of a previously buffered VOIP packet based on a comparison of the frame sequence number of the VOIP packet and the frame sequence numbers of the previously buffered VOIP packets;
   buffering the received VOIP packets if:
      the VOIP packet is not received after the threshold time point, and
      the VOIP packet is not the duplicate of a previously buffered VOIP packet; and
   playing the buffered VOIP packets.

2. The method of claim 1, further comprising:
   discarding the VOIP packet if:
   the VOIP packet is determined as received after the threshold time point, or
   the VOIP packet is determined to be the duplicate of a previously buffered VOIP packet.

3. The method of claim 1, wherein the threshold time point corresponds to a playback time at which the buffered VOIP packets are to be played.

4. The method of claim 1, wherein:
   the buffering step comprises queuing the VOIP packet based on the frame sequence number; and
   the playing step plays the buffered VOIP packets in an order in which the VOIP packets are queued.

5. The method of claim 1, wherein the playing step comprises:
   judging if a playback time is reached; and
   playing the buffered VOIP packets each time a playback time is judged to have been reached.

6. A wireless communication device for processing Voice over Internet Protocol (VOIP) packets comprising:
   a jitter buffer buffering a plurality of VOIP packets from a plurality of different base stations at the wireless communication device of a user equipment, the VOIP packets being related to a same VOIP transmission, wherein each of the plurality of VOIP packets includes a time stamp and a frame sequence number; and
   a jitter buffer controller controlling the buffering of the plurality of VOIP packets and playing of the buffered packets, the jitter buffer controller includes a clock providing a clock signal, wherein the jitter buffer controller is adapted for determining if a VOIP packet is received after a threshold time point based on the time stamp and the clock signal determining if the VOIP packet is a duplicate of a previously buffered VOIP packet based on the frame sequence number of the VOIP packet and the frame sequence numbers of the VOIP packets already buffered in the jitter buffer; and instructing the jitter buffer to buffer the VOIP packet if the VOIP packet is not received after the threshold time point and is not the duplicate of a VOIP packet in the jitter buffer.

7. The device of claim 6, wherein the jitter buffer controller discards the VOIP packet if the VOIP packet is determined as received after a threshold time point or is determined to be the duplicate of a previously buffered VOIP packet so the VOIP packet is not buffered in the jitter buffer.

8. The device of claim 6, wherein the threshold time point corresponds to a playback time at which the buffered VOIP packets are to be played.

9. The device of claim 6, wherein the jitter buffer queues the VOIP packets in an order specified by the frame sequence numbers of the VOIP packets based on instructions received from the jitter buffer controller.

10. The device of claim 6, wherein the jitter buffer controller further comprises:
    a playback mechanism playing the buffered VOIP packets each time a playback time is judged reached,
    the jitter buffer controller judging the playback time is reached based on the clock signal provided by the clock.

* * * * *